Sept. 11, 1934.  I. B. WRIGHT  1,973,401
WIRE TYING MACHINE
Filed Aug. 9, 1932   6 Sheets-Sheet 3

INVENTOR.
IVAN B. WRIGHT
BY
HIS ATTORNEY

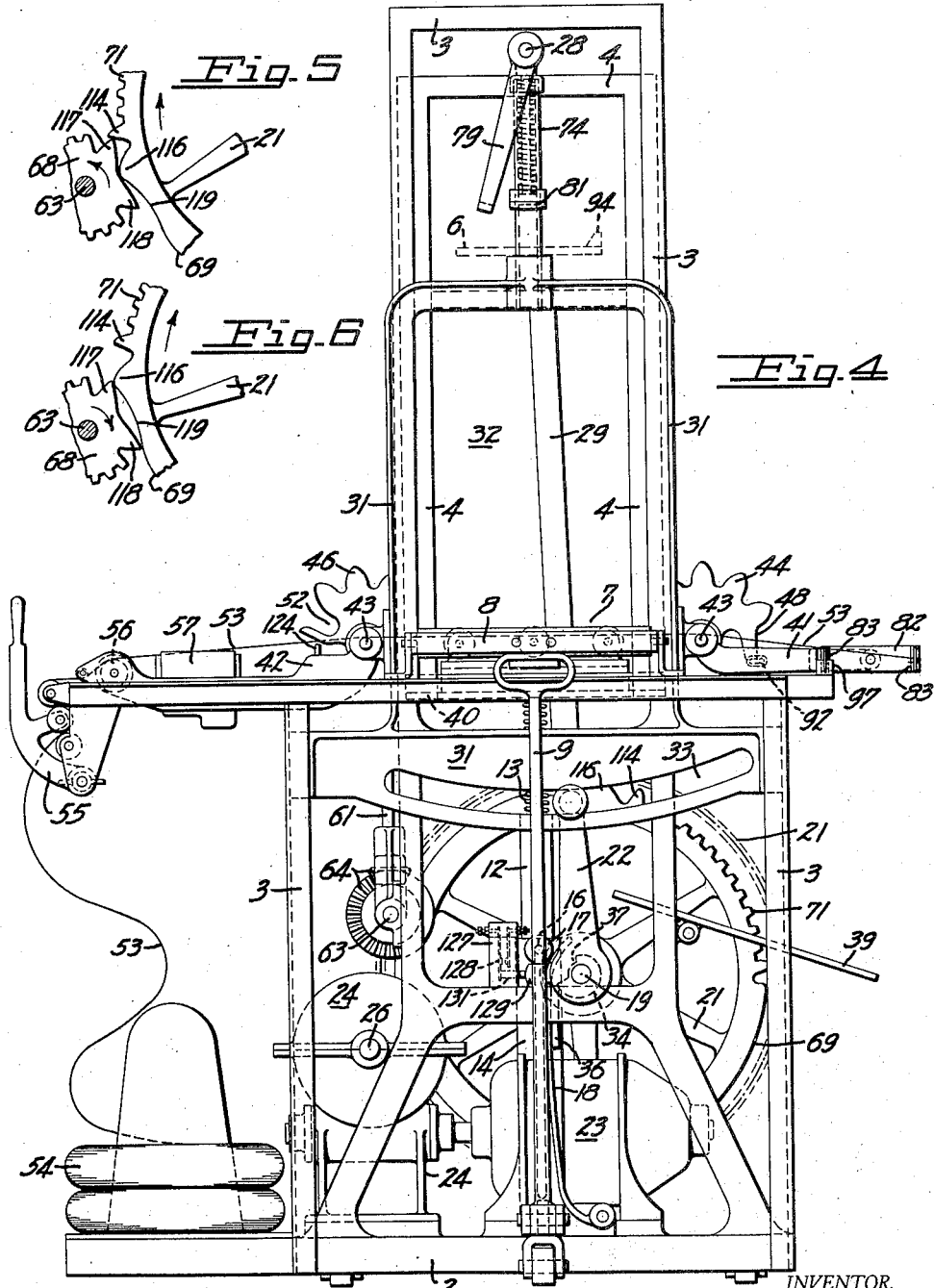

Sept. 11, 1934.  I. B. WRIGHT  1,973,401
WIRE TYING MACHINE
Filed Aug. 9, 1932   6 Sheets-Sheet 5
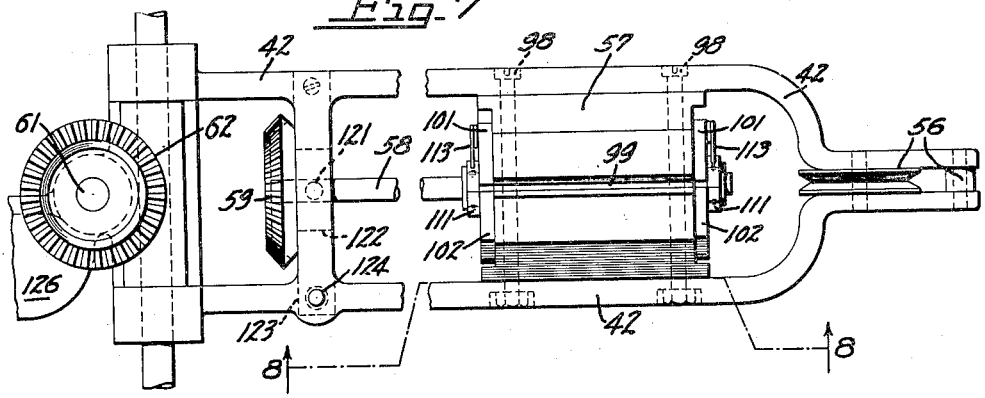
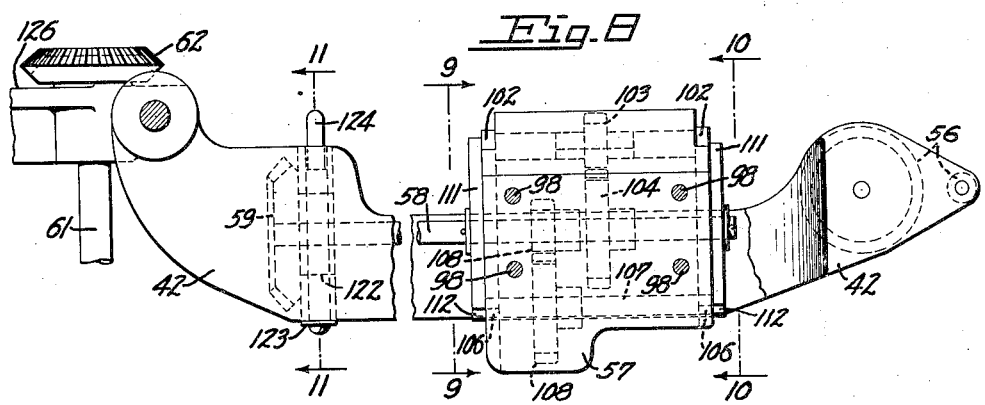
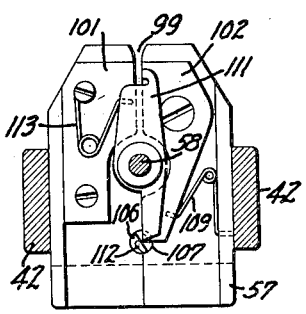 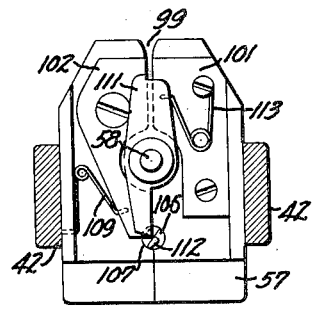 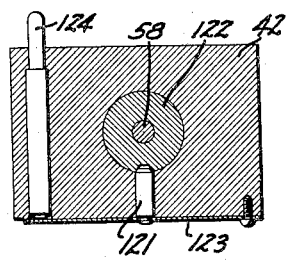
INVENTOR.
IVAN B. WRIGHT
BY
HIS ATTORNEY

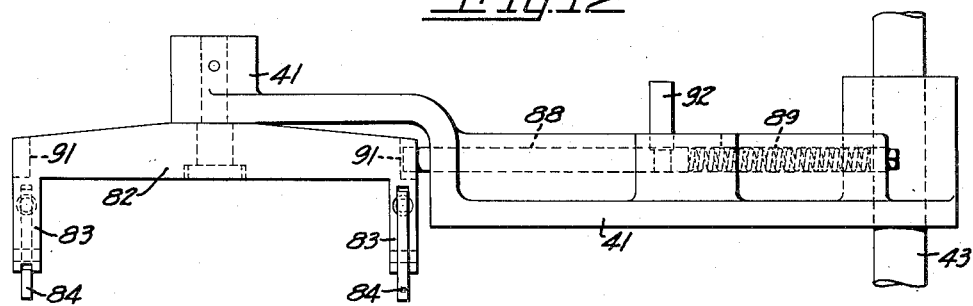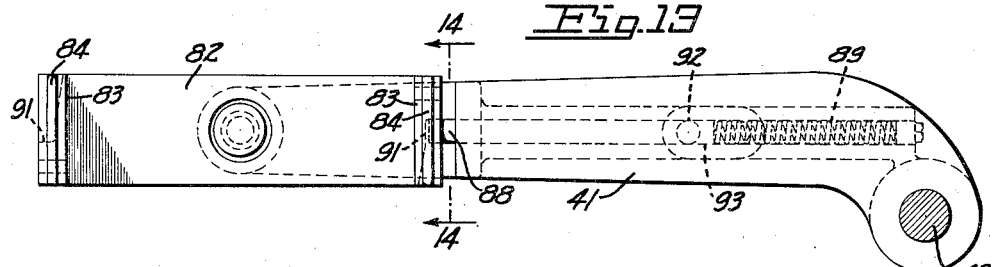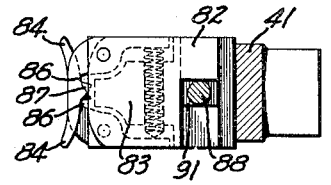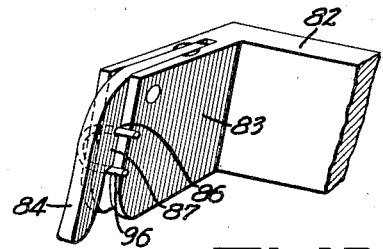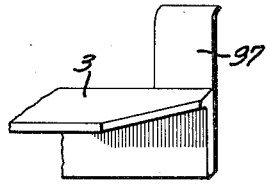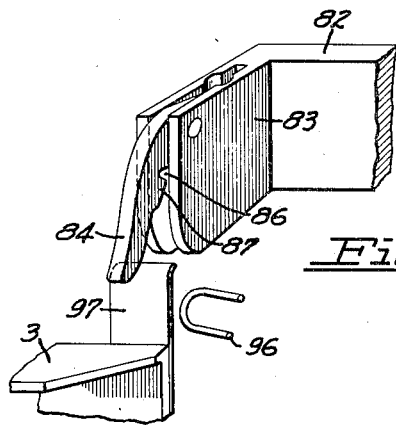

Patented Sept. 11, 1934

1,973,401

UNITED STATES PATENT OFFICE 1,973,401

WIRE TYING MACHINE

Ivan B. Wright, Seattle, Wash., assignor of one-third to Walter N. Hunt, San Francisco, Calif., and one-third to Parvin Wright, Seattle, Wash.

Application August 9, 1932, Serial No. 628,029

15 Claims. (Cl. 100—31)

This is a continuation in part of my co-pending application Serial No. 301,921, filed August 24, 1928.

My invention relates to a wire tying machine and more particularly to such a machine of the automatic type.

It is among the objects of my invention to provide a machine which will train the tie wire about a package to be tied, form a knot in the tie wire, cut the tied portion of the wire free from the supply roll, and discharge the tied package from the machine.

Other objects of my invention are to provide a machine of the character described which will tie a plurality of packages simultaneously, and which will automatically accommodate itself to packages of different size.

Still other objects of my invention are to provide an improved knotter mechanism and means for moving the same into engagement with the tie wire.

A further object of my invention includes the provision of improved means for handling the packages being tied in the machine.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 4 is an end elevational view of the machine taken in a direction indicated by the arrow 4 of Figure 1.

Figures 5 and 6 are fragmentary views showing details of certain of the knotter mechanism drive gears.

Figure 7 is a detail plan view showing the wire training arm which carries the knotter mechanism, portions of the arm being omitted to shorten the view; and Figure 8 is a side view of the same, partly in section and partly in elevation, taken in a plane indicated by the line 8—8 of Figure 7.

Figure 9 is a cross sectional view of the same arm showing the knotter mechanism in end elevation, taken in a plane indicated by the line 9—9 of Figure 8; and Figure 10 is a similar view showing the opposite end of the knotter mechanism, taken in a plane indicated by the line 10—10 of Figure 8.

Figure 11 is another cross sectional view of the arm showing the gear aligning latch, taken in a plane indicated by the line 11—11 of Figure 8.

Figure 12 is a plan view showing the wire training arm having the reversible wire positioning head; and, Figure 13 is a side elevation of the same.

Figure 14 is a cross sectional view of the arm showing the details of the clamps on the wire positioning head, taken in a plane indicated by the line 14—14 of Figure 13.

Figures 15 and 16 are perspective views showing the manner in which the wire ends are released from the clamps of the wire positioning head.

Figure 1:
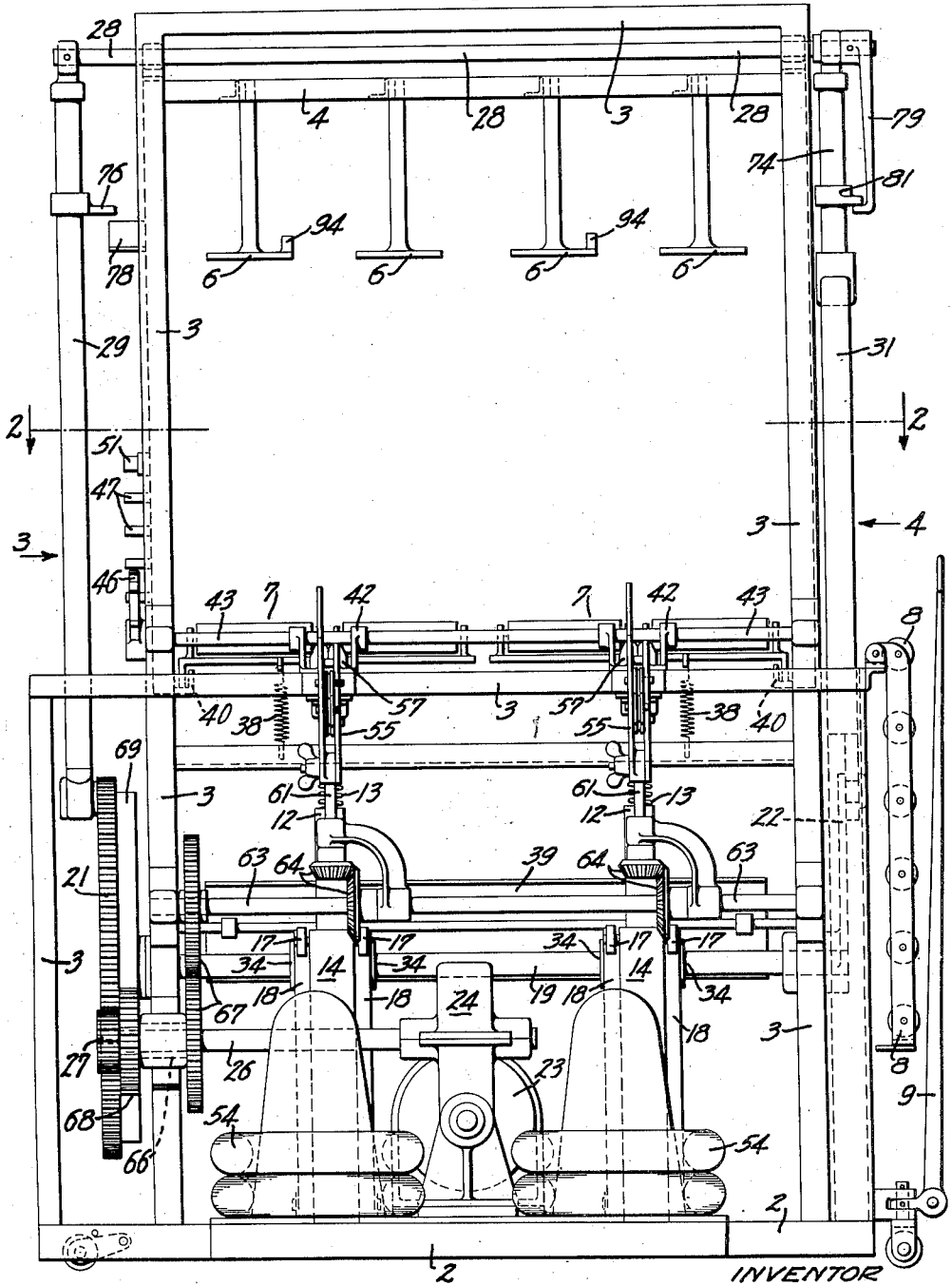
Figure 1 is a side view showing the wire tying machine embodying my invention.

In terms of broad inclusion, the wire tying machine embodying my invention comprises means for holding a package to be tied, and means engaging the tie wire for positioning an end of the same to lie across a face of the package. Means are provided for moving the package holding means to train the wire about two other faces of the package, and means are provided for moving the wire engaging means to train the wire across a fourth face of the package. Means are also provided for forming a knot in the wire to secure the same about the package and for cutting the tied portion of the wire from the supply roll, and means are provided for discharging the tied package from the holding means. Means are also provided for returning the package holding means to receive another package, and means are provided for moving the wire engaging means to place the free end of the supply wire in position to lie across a face of the next package.

In greater detail, the wire tying machine embodying my invention comprises a movably mounted base 2 supporting a main frame 3. A frame 4, within which the packages to be tied are positioned, is slidably mounted in the main frame 3, and is provided with a plurality of depending pressure plates 6. The packages are supported in the slidable frame by a pair of depressible roller top platforms 7, mounted independently of the slidable frame. By this arrangement packages on the platforms will be depressed when the sliding frame 4 is lowered, by reason of the pressure plates 6 bearing downwardly on the top surfaces thereof.

The slidable frame 4 is designed to have sufficient movement to depress the upper surfaces of the packages to the plane normally occupied by the platforms. The packages are introduced into the machine from the right hand side as shown in Figure 1, assisted by a roller table 8 pivotally mounted to the main frame and supported at its outer end by the tongue 9 when the machine is in use. Note Figures 2 and 4.

Figure 3:
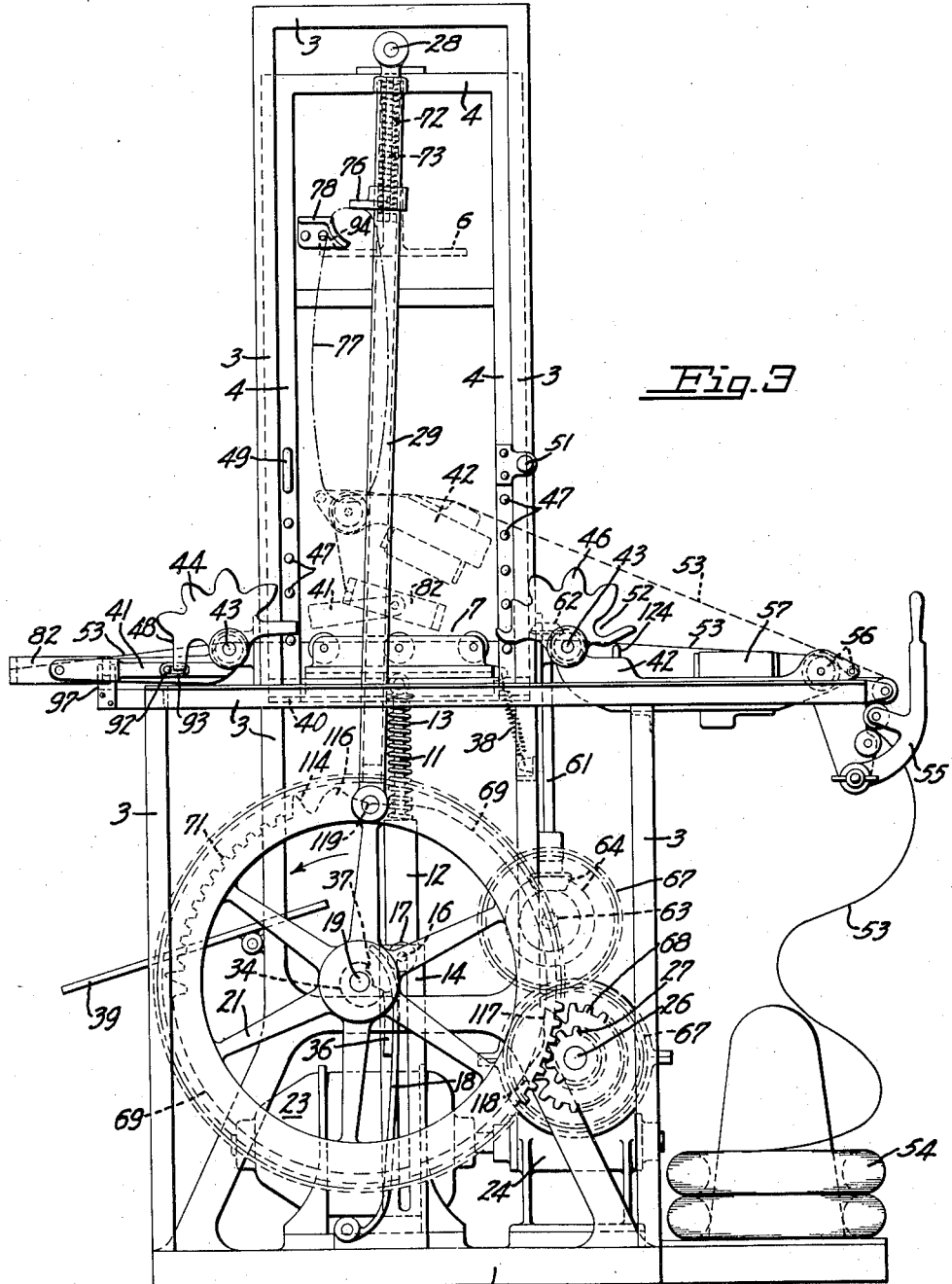
Figure 3 is an end elevational view of the machine taken in a direction indicated by the arrow 3 of Figure 1.

The depression of the packages by the pressure plates 6 in the downward movement of the slidable frame 4 is resisted by the platforms 7. As best shown in Figure 3, the platforms are each pivoted on the upper end of a rod 11 which is slidable in a tube 12; a compression spring 13 being interposed between the platforms and the tube. The tube 12 in turn is slidably mounted in a slotted tubular guide 14; a cross pin 16 carried by the tube 12 being arranged to project through the slots. A roller 17 is provided on each projecting end of the pin, and downward movement of tube 12 is resisted by pressure bars 18 pivoted to the base 2 and arranged to bear against the rollers 17.

Means are provided for lowering and elevating the slidable frame 4. A cross shaft 19 is journaled on the main frame below the platforms 7, and carries at one end thereof a bull wheel 21 and at the other end a crank 22. The cross shaft 19 is driven by a suitable motor 23 through a gear reduction 24 connected by a shaft 26 with a drive pinion 27 meshed with the bull wheel 21.

A cross rod 28 is journaled on the upper end of the slidable frame 4 and is connected at one end with the bull wheel 21 through a pitman 29 and at the other end to the crank 22 through a connecting frame 31 slidably mounted in the main frame 3. The connecting frame 31 is provided with a rectangularly shaped opening 32 through which the packages may be passed into the machine from the roller table 8. Note Figure 4. The connecting frame 31 is also provided with an arcuate slot 33 in which the outer end of the crank 22 is adapted to work.

By this arrangement the slidable package holding frame 4 is lowered from its normally elevated position and then returned to that position when the drive motor rotates the bull wheel through one revolution. Considering that packages have been placed in position on the platforms 7 and that the bull wheel 21 makes one revolution counterclockwise as viewed in Figure 3, the slidable frame 4 first begins to lower without resistance until the pressure plates 6 rest on the tops of the packages. Continued lowering of the slidable frame 4 now begins to depress the supporting platforms 7. At first the compression springs 13 are stressed to compress the packages, and finally the resistance offered by the pressure bars 18 is overcome and the rollers 17 start moving downwardly. The springs 13 not only serve to compress the packages, but also adapt the machine for accommodating various sized packages, as will readily be understood.

The downward movement of the rollers 17 is regulated by the position of the pressure bars 18. This regulation is effected by suitable cams 34 mounted on the drive shaft 19. The regulating cams are shaped and proportioned to allow the pressure bars to gradually recede as the bull wheel progresses in its revolution, until finally at a selected portion of the bull wheel movement the cam follower plate 36 of each pressure bar 18 drops in a recessed portion 37 of the cam 34 to release all pressure on the rollers 17 and allow the table supporting tubes 12 to drop to the bottom of their guides 14.

This relieves the pressure on the packages and the first action of course is for the compression springs 13 to elongate, after which the supporting platforms 7 drop with their packages. The downward movement of the platforms is checked however by the suspension springs 38 which are connected so that the platforms are forced to rotate about their pivot mountings. This tipping of the platforms causes the packages to slide therefrom and out of the machine over the discharge chute 39.

Continued turning of the bull wheel 21 results in the slidable frame 4 being elevated, and during this course the platforms 7 are returned to their upper positions by suitable channels 40 mounted on the lower end of the slidable frame and positioned to engage under the platforms. Note Figure 1. The upward movement of the platforms 7 carries up the rollers 17, and when the slidable frame and platforms have finally reached their upper limits the pressure bars 18 are extended by the cams 34 to again resist the downward movement of the platforms.

Means are provided for training tie wires about the packages. For this purpose a pair of wire training arms 41 and 42 are provided adjacent the sides of the package supporting platforms 7. These arms are pivotally mounted on the main frame on suitable cross shafts 43 and are adapted to move through the sides of the main frame to overlapped positions across the tops of the platforms. The arms are rotated by suitable mutilated gears 44 and 46 mounted on the shafts 43 and meshed with pins 47 projecting from the slidable frame 4. These gears and pins are shaped and arranged so that the arms 41 are positioned over the tops of the platforms 7 prior to the arms 42.

In the recovery movement of the arms the arms 42 move out first to clear the path for the arms 41. When all the arms are in the normally extended position, as shown in Figures 3 and 4, the lowermost of the pins 47 engage under the gears 44 and 46 to hold the arms against upward movement. As the slidable frame moves downwardly the successive pins engage the gears to rotate the arms upwardly and inwardly; the arms 41 being rotated more rapidly than the arms 42.

Since the arms 41 reach their inwardly limiting positions first, the gear 44 is provided with a flattened portion 48 along which the flattened upper pin 49 may slide. The continued movement of the slidable frame rotates the arms 42 so that the latter overlie the arms 41. When the slidable frame 4 finally reaches its lowermost position the arms 42 are lying on the arms 41 with the upper pin 51 engaging the deep outer recess 52 of the gear 46.

When the slidable frame 4 starts upwardly the pins 51 move the arms 42 out rapidly while the flattened pins 49 on the opposite side merely slide along the flattened portions 48 of the gears 44. When the gears 44 finally start rotating to move the arms 41, the arms 42 have moved out sufficiently to clear the path for the former.

The tie wires 53 are peeled from suitable supply rolls 54 and are threaded through a suitable adjustable tensioning mechanism 55 and thence passed over guide rollers 56 journaled in the ends of the arms 42. From these points the guide wires extend across the platforms 7 to the ends of the arms 41, at which point they are suitably secured. By this arrangement it is apparent that when the packages are placed on the platforms the tie wires pass across the lower face thereof.

When the slidable frames are lowered and the packages depressed, the latter move against the tie wires to train the same about their side faces. Finally when the arms 41 and 42 are rotated over the tops of the packages the latter are completely encircled by the tie wires. The tensioning devices 55 cause the wires to be drawn tightly about the packages.

Figure 2:
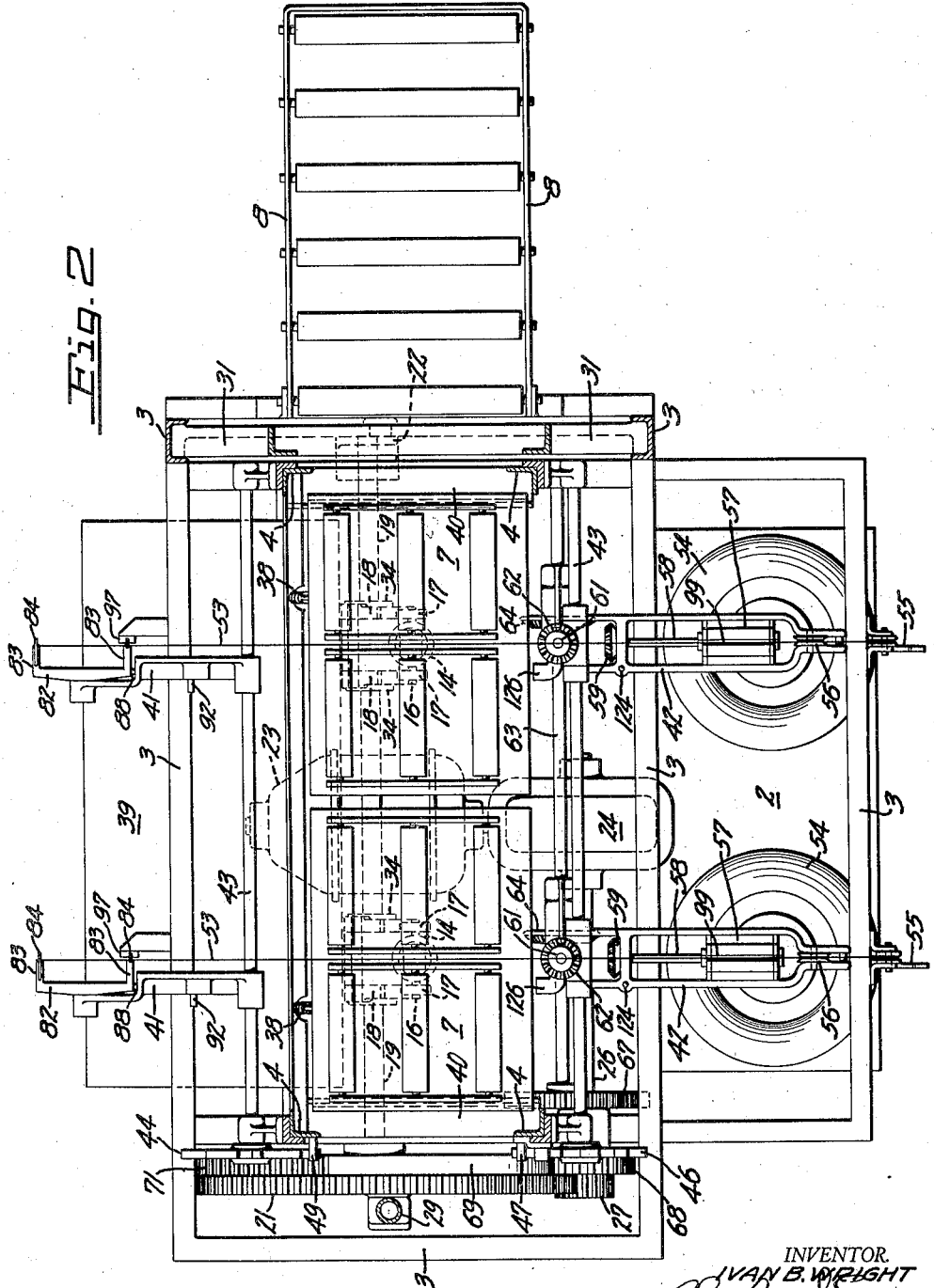
Figure 2 is a horizontal sectional view of the machine taken in a plane indicated by the line 2—2 of Figure 1.

Means are provided for forming knots in the tie wires. Suitable knotter mechanisms 57 are provided for this purpose and are mounted on the arms 42; the latter having an open framework construction to receive the mechanisms, as best shown in Figure 2. Each knotter mechanism includes clamping, twisting and cutting elements, and these elements are actuated by a shaft 58 which is provided with a miter gear 59 adjacent the arm supporting shaft 43. Vertical shafts 61 are also provided adjacent the arm shaft, and carry at their upper ends the miter gears 62 with which the gears 59 are adapted to mesh when the arms 42 are in the tying positions over the packages.

The vertical shafts 61 are rotated by a cross shaft 63 through suitable gears 64, and the shaft 63 is in turn driven by a sleeve shaft 66 through the spur gears 67; the sleeve shaft 66 and the power shaft 26 having a common bearing. The sleeve shaft 66 carries a special gear 68 adapted to operatively engage with a track 69 mounted for rotation with the bull wheel 21 and having a specially designed rack section 71, as will hereinafter be described in detail; it being evident and sufficient at this time to note that the knotter mechanism driving gear 68 rotates only during a selected portion of the bull wheel revolution.

Means are provided for stopping the downward movement of the slidable frame 4 after the packages and wire training arms have reached the tying position, and during the time the knotter mechanism is tying the wire. To accomplish this the pitman 29 is provided with a telescoping section comprising a compression spring 72 interposed between the upper end of the hollow pitman and a plunger 73 which is secured to the cross rod 28. The upper portion of the connecting frame 31 on the opposite side of the machine is provided with a similar telescoping section 74. In order to render the telescoping sections inoperable during the first part of the bull wheel revolution and when packages are being depressed to their tying positions, means are provided for rigidly connecting the pitman 29 and connecting frame 31 to the slidable frame 4.

For this purpose a lug 76 is secured on the pitman. With reference to Figure 3, it will be noted that during one revolution of the bull wheel 21 the outer point of the lug will describe a path as indicated by the line 77. A stop block 78 is secured to the side of the slidable frame 4 in the path of movement of the lug so that the lug will engage the block during the first portion of the bull wheel revolution, but is arranged to slide off the block when the package has been lowered to its tying position and the arms 41 and 42 are in place thereover. After the lug has slipped off the block the bull wheel may proceed in its rotation and the pitman continue in its downward movement without causing further downward movement of the slidable frame; it being understood that at this time the spring 73 in the telescoping section of the pitman is compressed.

On the opposite end of the machine the connecting frame 31 is also rigidly tied to the slidable frame 4 by the hooked arm 79 depending from the cross rod 28 and engaging with a block 81 fixed to the connecting frame 31. The movement of the arm 79 is controlled by the rotation of the cross rod 28 which in turn depends upon the swing of the pitman 29. The arms 79 and lug 81 are shaped and positioned to engage and disengage simultaneously with the engagement and disengagement of the lug 76 with the block 78 on the opposite end of the machine. During the time when the bull wheel is rotating without causing movement of the slidable frame the teeth in the rack 71 engage with the gear 68 to actuate the knotter mechanisms for tying and cutting the wire.

Upon completion of these operations the follower blocks 36 of the pressure bars 18 drop into the recesses 37 of the cams 34 to release the rollers 17. Immediately the tables drop to dump the tied packages and discharge the same from the machine. Continued rotation of the bull wheel raises the slidable frame 4 and returns the platforms 7 to their normally elevated positions to receive other packages. Of course during the upward movement of the slidable frame the wire training arms 41 and 42 are returned to their extended positions.

Means are provided for relaying the tie wire across the tying positions when the arms effect their recovery movement. To assist in the accomplishment of this result each of the arms 41 is provided with a reversible wire holding head 82. As best shown in Figures 12 to 14 the reversing head 82 is pivoted at its center to the outer end of the arm 41 and is of forked construction having the projecting arms 83 which are provided with suitable means for engaging the wire. As shown in Figure 14 each arm 83 carries a pivoted spring pressed clamp 84 having an outwardly extending finger-like portion provided with a wire receiving recess 86 and an adjacent tooth 87 about which the tie wire is adapted to bend; note Figures 15 and 16. It is also to be noted that the finger-like clamps 84 project in opposite directions.

Referring principally to Figures 12 and 13, means are provided for locking the reversible wire holding head 82 in either one or the other of its positions. For this purpose a latch bolt 88 is slidably mounted in the arm 41 and is urged by a suitable spring 89 into engagement with one of the receiving slots 91 formed in the ends of the wire holding head 82. A pin 92 working in a slot 93 is provided for retracting the latch bolt 88.

In setting up the machine for operation the tie wire is threaded through the machine and secured in the outer arm clamp of the reversible head, as shown in Figures 3 and 4. When the machine is in operation and the arms 41 and 42 move into the tying position over the package, and the portions of the wires adjacent the knotter mechanism 57 are overlapped by reason of the fact that the free end of the tie wire is secured by the finger clamp 84 at the outer end of the wire holding head 82. The portion of the tie wire which is brought into the tying position by the arm 42 is deposited in the finger clamp 84 at the inner end of the wire holding head 82.

After the wire has been tied and cut by the knotter mechanism it is apparent that the free end of the wire leading from supply is now held at the inner end of the wire holding head 82; and if the wire is to be at the outer end of the head when the arm 41 is extended, means must be provided for reversing the position of the head. This is automatically accomplished when the arms are retracted. A lug 94 is arranged on one of the pressure plates 6 to engage the pin 92 and release the latch bolt 88 when the arm 41 is down on the top of the package. As soon as the arm 42 starts upward the tension of the tie wire 53 tends to turn the wire holding head 82 about its pivotal mounting. This action of course will completely reverse the head 82 when the arm 41 has elevated to a point where its axis is in line with the tie wire.

When completely reversed the latch bolt 88 will snap into engagement to lock the head. As the arm 41 continues in its recovery movement to the extended position the tie wire is bent about the tooth 87 of the clamp 84 to provide a secure grip for resisting the tension offered when the next package is being lowered against the wire. The small loop of wire 96 left in the opposite end of the holding head after the knot is formed is removed by a stripper plate 97 when the arm 41 reaches its extended position. The action of the stripper plate in effecting this removal will be clearly understood from the showings made in Figures 15 and 16.

As has previously been described, the knotter mechanisms 57 are mounted on and carried into and out of their operating positions by the arms 42. Referring particularly to Figures 7 to 11, the knotter mechanism comprises a suitable housing structure clamped to the arm 42 by the bolts 98. The leading side of the housing is provided with a receiving slot 99 for engaging the lapped portions of the wire in the tying position. The lapped wires adjacent the ends of the knotter housing are clamped between a fixed jaw 101 and a pivoted jaw 102.

The portions of the lapped wires between these end clamps are engaged by a notched twister pinion 103 suitably journaled in the housing; this pinion being rotated by a gear 104 mounted on the shaft 58. The movable jaws 102 of the clamp are actuated by cams 106 formed on the ends of a cross shaft 107, which shaft is rotated by the shaft 58 through suitable gears 108, and the jaws 102 are resiliently held against the cams 106 by the action of suitable springs 109.

The means for cutting the free ends of the wire from the knot comprises cutting bars 111 freely journaled on the shaft 58 and actuated by suitable cams 112 formed on the ends of the cross shaft 107 adjacent the clamp actuating cams 106. These cutter bars are resiliently held against their cams by suitable springs 113. The movements of the notched pinion 103, clamp jaws 102 and cutter bars 111 are timed so that the clamp jaws 102 and cutter bars 111 are positioned to one side of the receiving slot 99 when the notch of the twister pinion 103 is in register with the slot for receiving or discharging the wires. The knot is preferably completed in four revolutions of the twister pinion.

Means are provided for rotating the twister pinion 103 a fraction of a revolution beyond the four revolutions, and then return the pinion to its normal position in register with the receiving slot 99 to permit ejection of the tied wire. The purpose of the overtwist followed by the back twist is to slacken the knot in the slotted pinion sufficient to permit ready removal of the tied wire from the knotter mechanism. The means for accomplishing the overtwist and subsequent reversal of the twister pinion is embodied in the design of the gear 68 and the rack 71 on the bull wheel 21.

During the major portion of the bull wheel rotation the smooth portion of the track 69 slides past the gear 68 without revolving the latter. When the rack portion 71 reaches the gear 68 however its teeth move into mesh with the gear teeth and the gear starts rotating. This rotation continues until the large tooth 114 at the trailing end of the rack passes out of engagement with the gear 68. Note Figure 5. At this time the twister pinion will have completed its four revolutions, and be ready to effect the overtwist. The rotation of gear 68 is continued for a fraction of a revolution by the hump 116 bearing against the leading wing tooth 117 of the gear 68. In the continued rotation of the bull wheel however the trailing wing tooth 118 of the gear 68 binds on the bottom of the curved recess 119. At this time of course the gear 68 is prevented from continuing its rotation. Note Figure 6.

As the bull wheel continues its rotation the leading wing tooth 117 is forced to slide back along the bottom of the recess 119, and this operates to reverse the rotation of the gear 68. The design of these elements are such that the reversed rotation is equal to the fraction of the revolution imparted to give the overtwist. When the wing teeth 117 and 118 ride out over the smooth portion of the track 69 the gear 68 will no longer rotate, while the bull wheel is free to continue its rotation. At this time the twister pinion is positioned so that its notch is in register with the receiving slot 99, and the arms are moved outwardly to their extended positions prior to effecting another tying operation.

When the arm 42 is retracted its gear 59 disengages from the gear 62. In order to assure the proper registration of these gears when the arm is again moved into the tying position, means are provided for locking the gear 59 against rotation as it leaves the gear 62. In this connection attention is had particularly to Figure 11, in which it will be noted that a locking pin 121 is positioned to engage a notch in the hub 122 of the gear 59. The pin 121 is carried by a resilient strip 123 secured to the arm 42. A plunger 124 is slidably mounted in the arm 42 and is positioned to bear against the inner side of the strip 123.

When the arm 42 is in the tying position and the gears 59 and 62 are meshed the plunger 124 bears against the plate 126 to hold the locking pin 121 out of engagement with the hub. As the arm 42 is retracted however the plunger 124 is allowed to extend so that the pin 121 is pressed against the gear hub and into engagement with its notch; the notch of course being positioned so that it will receive the pin 121 when the notch of the twister pinion 103 is in register with the receiving slot 99 of the knotter mechanism housing.

Means are provided for limiting the bull wheel to one revolution after the motor is started. For this purpose a limit switch 127 is provided having contactors 128 resiliently pressed together to close the motor circuit. A lug 129 extending radially from the hub of the bull wheel is provided, and is arranged to ride against a pin 131 connected with one of the contactors to open the latter when the slidable frame 4 is in its uppermost position. The usual starting button at the motor causes the motor to turn over sufficiently to rotate the lug 129 off the pin 131 and close the contactors.

I claim:

1. A wire tying machine comprising an arm for training the tie wire across a face of the package to be tied, a reversible wire holding head movably mounted on said arm, clamp means on the head for holding the tie wire, means for locking the head in a selected position, and means for releasing the locking means in a selected position of the wire training arm.

2. A wire tying machine comprising an arm for training the tie wire across a face of the package to be tied, a reversible wire holding head mounted on said arm, clamp means on the head for holding the tie wire, and means for locking the head in a selected position.

3. A wire tying machine comprising a pair of movably mounted arms for training the tie wire across a face of the package to be tied, a wire holding head movably mounted on one of said arms, clamp means on the head for holding the wire, means for locking the head in a selected position, and a knotting mechanism carried by the other arm and arranged to move into a tying position adjacent said head and operatively engage the tie wire.

4. A wire tying machine comprising a slotted twister pinion movable into and out of engagement with the tie wire, means for turning said pinion a predetermined number of revolutions plus a fraction of a revolution while in engagement with the tie wire, and positive drive means for reversing the rotation of said pinion to turn the latter back said fraction of a revolution prior to movement thereof out of engagement with the tied wire.

5. A wire tying machine comprising a pair of pivotally mounted arms for training the tie wire across a face of the package to be tied, a wire holding head on one of the arms, a knotter mechanism on the other arm, means for rotating the holding head arm into position over said face of the package, means for rotating the knotter arm into position over said holding head arm after the latter is in place, means for actuating the knotter mechanism, means for retracting the knotter arm, and means for retracting the positioning head arm after the other arm is clear.

6. A wire tying machine comprising a slidable frame for holding a package to be tied, a drive wheel, a pitman connecting the frame for movement with said wheel, a telescope section in the pitman so that the frame may be stopped without stopping the wheel, and means for connecting the pitman directly with the frame to render the telescoping section inoperable during a predetermined period of rotation of said wheel.

7. A wire tying machine comprising a platform for supporting the package to be tied, a slidable support for said platform, a pressure bar bearing against said support to control the movement thereof, and a cam bearing against the pressure bar to regulate its position.

8. A wire tying machine comprising a platform for supporting the package to be tied, a slidable support for said platform, a spring interposed between the platform and its support, a pressure bar bearing against said support to control the movement thereof, and a cam bearing against the pressure bar to regulate its position.

9. A wire tying machine comprising a movable frame, a drive wheel, a pitman connected to the wheel, resilient means connecting the pitman to the frame, and means for connecting the pitman directly to the frame.

10. A wire tying machine comprising a movable frame for holding the package to be tied, a revolvable arm for training the wire about the package, a gear on the arm, and rack means on the frame with which the gear is engageable for imparting rotation to the arm upon movement of the frame.

11. A wire tying machine comprising a movable frame for holding the package to be tied, a revolvable arm for training the wire about the package, a gear on the arm, and rack means on the frame with which the gear is engageable for imparting rotation to the arm upon movement of the frame, and a knotter mechanism carried by said arm.

12. A wire tying machine comprising a movable frame for holding the package to be tied, a pair of revolvable arms for training the wire about the package, a gear on each of said arms, and rack means on the frame with which the gears are engageable for imparting rotation to the arms upon movement of the frame.

13. A wire tying machine comprising a movable frame for holding the package to be tied, a pair of revolvable arms for training the wire about the package, a gear on each of said arms, rack means on the frame with which one of the gears is engageable for imparting rotation to one of the arms upon movement of the frame, and rack means on the frame with which the gear of the other arm is engageable and for imparting rotation to the latter arm after the first arm has started moving.

14. A wire tying machine comprising means for holding the package to be tied, means for moving the holding means, a pair of movable arms for training the tie wire about the package, means on the holding means for imparting movement to one of the arms, and means on the holding means for imparting movement to the other arm after the first arm has started moving.

15. A wire tying machine comprising a pair of movable arms for training the tie wire about the package to be tied, means for moving one of the arms to a position overlying a face of the package, means for moving the second arm to a position overlying the first arm, and a knotter mechanism carried by said second arm.

IVAN B. WRIGHT.